(No Model.)
H. H. NORRINGTON.
INKING PAD.
No. 600,695. Patented Mar. 15, 1898.
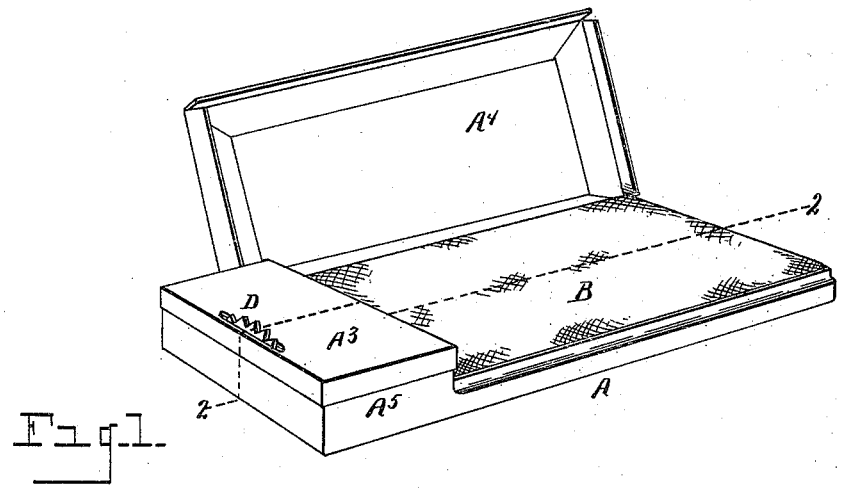
Fig. 1.
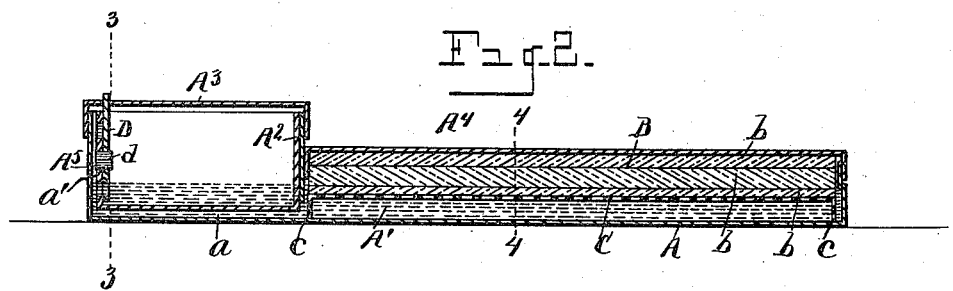
Fig. 2.
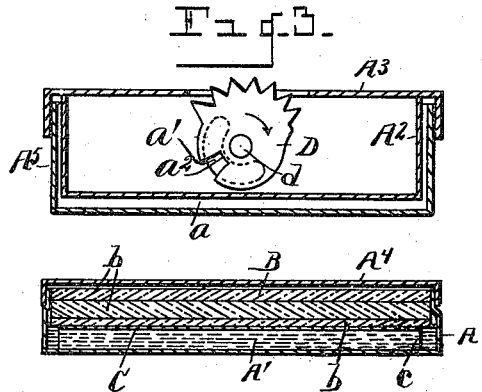
Fig. 3.
Fig. 4.
WITNESSES
O. B. Boenziger.
Mary Hickey.
INVENTOR
Henry H. Norrington
By his Attorney
Newell S. Wright
THE NORRIS PETERS CO., PHOTO-LITHO., WASHINGTON, D. C.

UNITED STATES PATENT OFFICE.

HENRY H. NORRINGTON, OF WEST BAY CITY, MICHIGAN.

INKING-PAD.

SPECIFICATION forming part of Letters Patent No. 600,695, dated March 15, 1898.

Application filed April 17, 1897. Serial No. 632,652. (No model.)

*To all whom it may concern:*

Be it known that I, HENRY H. NORRINGTON, a citizen of the United States, residing at West Bay City, county of Bay, State of Michigan, have invented a certain new and useful Improvement in Inking-Pads; and I declare the following to be a full, clear, and exact description of the invention, such as will enable others skilled in the art to which it appertains to make and use the same, reference being had to the accompanying drawings, which form a part of this specification.

My invention relates to certain new and useful improvements in an inking-pad; and it consists of the construction, combination, and arrangement of devices hereinafter described and claimed, and illustrated in the accompanying drawings, in which—

Figure 1 is a view in perspective, illustrating features of my invention. Fig. 2 is a longitudinal section with the cover closed, the section through the box A and reservoir $A^2$ being on the line 2 2, Fig. 1. Fig. 3 is a cross-section on the line 3 3, Fig. 2. Fig. 4 is a cross-section through the box A on the line 4 4, Fig. 2, but showing a modification in the construction of the plate C.

My invention is more particularly designed to provide a fountain inking-pad, my pad being of that class of devices commonly used in inking rubber and other stamps.

The aim of my invention is to construct a device of this class whereby the inking-pad will be readily self-supplied or capable of being replenished from a suitable source of supply connected therewith in a very convenient and ready manner.

I carry out my invention as follows:

A represents the main portion of a box or case, and B an inking-pad located therein. Said pad may be made in any suitable manner, as of several layers $b$ of any suitable material—as of felt, for example, or other proper absorbent material. The inking-pad B is supported upon a perforated or loose plate C, said plate being supported above the bottom of the box, whereby an ink-chamber $A'$ is provided in the bottom of the box underneath the perforated or loose plate and the inking-pad. The box A is provided, preferably at one end thereof, with an ink-reservoir (indicated at $A^2$) provided with a cover $A^3$, which cover is preferably independent of the cover $A^4$, which latter cover may close down over the inking-pad B. The reservoir $A^2$ is preferably made removable and is located in an end portion $A^5$ of the case or box A, the portion $A^5$ and the reservoir $A^2$ preferably projecting upward above the closed cover $A^4$, as indicated more particularly in Fig. 2. The reservoir $A^2$ is supported in any suitable manner above the bottom of the end portion $A^5$ of the case, as upon ribs $a^3$ therebeneath, forming a passage $a$ beneath the reservoir communicable with the chamber $A'$. One side of the reservoir $A^2$ is constructed with an orifice $a'$, preferably an elongated arc-shaped orifice, as indicated more particularly in Fig. 3, partly in dotted lines. To partially close said orifice, I provide a disk or plate D, which may be toothed or milled upon its upper edge and project through the cover $A^3$, said disk or plate being formed with a notch or recess (indicated at $a^2$, Fig. 3) through which ink may discharge from the reservoir $A^2$ into the passage $a$.

By referring to Fig. 3 it will be evident that when the reservoir is full of ink the plate D being turned downward in the direction of the arrow would bring the notch $a^2$ adjacent to the upper end of the slot $a'$, so that the reservoir would feed through the upper end of said slot. When it becomes necessary to still further furnish the inking-pad with ink, or, in other words, to discharge more ink into the chamber $A'$ beneath the inking-pad, the disk or plate D should be turned in the direction opposite the arrow, thereby forcing the notch $a^2$ downward alongside the slot $a'$ to enable the ink to feed from a lower lever from the reservoir. By continuing to turn the disk or plate D in the direction opposite the arrow it is evident that the reservoir may be made to feed even to the very bottom thereof. The reservoir being covered with a cover $A^3$, it is obvious that to replenish the pad it only becomes necessary occasionally, as circumstances demand, to rotate the disk D a little farther over in a direction opposite the arrow. This construction is simple, economical, never liable to get out of order, and of superior efficiency. The disk D is pivoted on the side of the case, as indicated at $d$, in such a manner as to have a tight and close engagement against the side of the reservoir. The reservoir may be filled with liquid ink in a convenient manner simply by lifting the cover A³. The ink will be fed from the chamber A' by capillary attraction.

I do not limit myself to any particular construction of the plate C, as a construction is contemplated which will permit the ink to percolate through or about the plate to be absorbed by the pad thereabove. Accordingly in Fig. 2 I have shown the plate as perforated, while in Fig. 4 said plate is shown as fitting loosely at its marginal edges within the case, so as to permit the ink passing thereabout. The plate C may be supported in the case to form the ink-chamber therebeneath in any suitable manner, as upon end flanges thereof turned downward, as indicated at c. It will be evident that the plate C will flex when the pad is struck with the device to be inked, so as to come into contact with the ink therebelow, thereby permitting the ink to be forced up through or past the plate to the inking-pad. The plate C, being loose, is obviously separable.

What I claim as my invention is—

1. The combination of a case formed with an ink-chamber in the base thereof, an inking-pad, a separable plate C located above the base of said case and above said ink-chamber and supporting said pad, said plate constructed to permit the passage of ink from said chamber to said pad, a reservoir communicable with said ink-chamber, a cover for said reservoir, and an additional device to control the feed from the reservoir to said ink-chamber, substantially as described.

2. The combination of a case formed with an ink-chamber, a separable, perforated plate C supported above the base of said case and above said ink-chamber, an inking-pad supported upon said plate, a reservoir located within said case communicable with said chamber, and a cover for said receptacle, and an additional adjustable device to control the feed from said reservoir to said chamber, whereby when the pad is struck ink will pass from said ink-chamber through said perforations to said pad, substantially as described.

3. The combination of a case formed with an ink-chamber, an inking-pad constructed to permit the passage of ink from said ink-chamber to said pad, a plate located contiguous to said chamber and supporting said pad, a reservoir adjacent to the ink-chamber constructed with an orifice through which the reservoir is communicable with said chamber, a cover for said reservoir, and an additional adjustable device in proximity to said orifice to control the discharge from said reservoir through said orifice to said ink-chamber, said plate being flexible, whereby when the pad is struck ink may pass from said ink-chamber to said pad, substantially as described.

4. The combination of a case formed with an ink-chamber, a pad located contiguous to said chamber, a reservoir located within the case supported above the base of said chamber forming a passage a between the base of the reservoir and the base of the case opening on a level with the base of the case into said ink-chamber, and constructed with an elongated orifice through which the reservoir is communicable with said passage, an oscillatory disk to partially close said orifice and to open the orifice toward the bottom thereof by a proper rotation of the disk to govern the feed, and means projecting to the exterior of the reservoir to operate said disk, substantially as described.

5. The combination of a case formed with an ink-chamber A', an inking-pad, a plate C supported above the base of the case and supporting the inking-pad, and an end portion A⁵, a reservoir located in said end portion provided with an orifice communicating with said ink-chamber, and means in proximity to said orifice to control said communication therethrough, said plate being flexible and constructed to permit the passage of ink from the ink-chamber to the pad, whereby when the pad is struck ink may pass from said ink-chamber to said pad, substantially as described.

6. The combination of a case forming an ink-chamber, an inking-pad, a plate supported above the base of the case and above the ink-chamber, a pad supported upon said plate, a reservoir constructed with an elongated orifice through which the reservoir communicates with said chamber, a cover for said reservoir, and a movable disk or plate projecting through said cover, formed with a recess partially closing said orifice, and arranged to open said orifice toward the bottom thereof upon a proper rotation of the disk, substantially as described.

In testimony whereof I sign this specification in the presence of two witnesses.

HENRY H. NORRINGTON.

Witnesses:
 N. S. WRIGHT,
 F. W. BUSH.